T. B. TALBERT.
OIL CLOTH.
APPLICATION FILED JUNE 6, 1918.

1,300,043.

Patented Apr. 8, 1919.

INVENTOR
THOMAS B. TALBERT
BY Hazard & Miller
ATT'YS.

UNITED STATES PATENT OFFICE.

THOMAS B. TALBERT, OF HUNTINGTON BEACH, CALIFORNIA.

OIL-CLOTH.

1,300,043.

Specification of Letters Patent.

Patented Apr. 8, 1919.

Application filed June 6, 1918. Serial No. 238,573.

*To all whom it may concern:*

Be it known that I, THOMAS B. TALBERT, a citizen of the United States, residing at Huntington Beach, in the county of Orange and State of California, have invented new and useful Improvements in Oil-Cloths, of which the following is a specification.

My invention relates to an oil cloth and a process of making the same.

It is an object of this invention to make an oil cloth which will lessen the cost of production and at the same time produce an article which is durable, answering every purpose of the oil cloth of common construction.

Oil cloths used as table covering and the like are commonly made by imposing upon a textile fabric a sufficient quantity of paints to form a flexible water proof coating. In order to dispense with the expensive textile fabric it has been proposed to use a paper back which is subjected to strong pressure and then to a treatment with boiled linseed oil. The paper is allowed to absorb as much of the linseed oil as possible. It is then dried and coated with a paint composed of linseed oil and a pigment, the coating being applied to both sides of the paper. Then as a final coat, varnish is applied.

I have discovered a new method of making oil cloth which comprises a flexible tough paper backing which dispenses with the linseed oil saturation referred to, which produces an exceedingly flexible tough oil cloth, provided with water proof coating.

In the accompanying drawings which form a part of this specification, I have illustrated the construction of my new oil cloth and in which.

Figure 1:
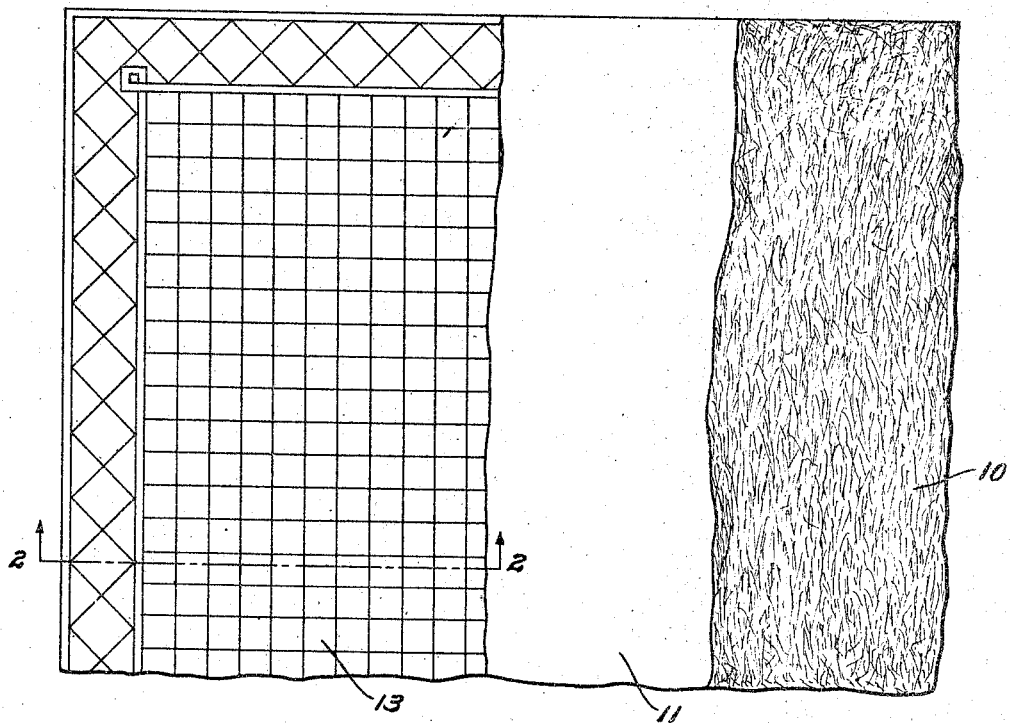
Figure 1 is a plan view of a section of the oil cloth, some of the layers being broken away for clearness of illustration.
Figure 2:
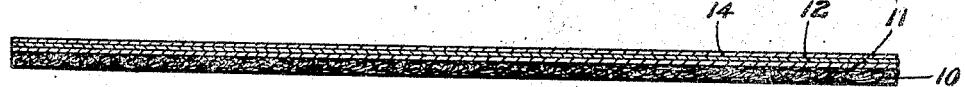
Fig. 2 is a vertical cross section on the line 2—2 of Fig. 1.
Figure 3:
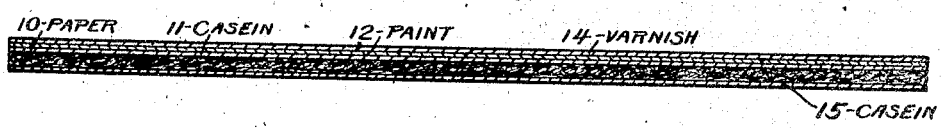
Fig. 3 is a similar cross section of a modified construction.

10 indicates a tough fibered paper of suitable thickness used as a backing or body of my oil cloth. I apply thereto a sizing 11 in order to prevent the coat of paint from striking in. The sizing I use is preferably a casein preparation. After the casein sizing is perfectly dry, I apply the coatings of paint 12. The paint is preferably made with a linseed oil vehicle, and a mineral body such as lithopone, which may be tinted with a suitable pigment, if desired. The paint is applied to the paper body and after the same is dry the paper is run through a polishing machine which polishes the surface of the coat of paint in order to produce a smooth even surface. Several coats of paint are applied and polished if necessary. After the final coat of paint has been applied, any desired pattern or ornamentation 13 is laid on. The final coating 14 consists of a varnish which is preferably of Chinese wood oil, because of the well known wearing and water proof qualities of the latter. The oil cloth produced by my method is inexpensive, flexible, water proof and wears as well if not better than the oil cloth produced by the ordinary methods. When the coating of paint is worn through the oil cloth is worn out and a paint coating on my oil cloth is fully as durable as the paint coating of other oil cloths.

Where the lower surface of the oil cloth is apt to come in contact with moisture, I apply a casein sizing 15 on the under face of the oil cloth, as shown in the construction illustrated in Fig. 3, to render the same water proof.

I claim:

1. An oil cloth consisting of a sheet of plain untreated paper, a coat of sizing, a coat of a heavy oil paint body, and a surface coat of varnish.

2. An oil cloth consisting of a sheet of plain untreated paper covered on both sides by sizing, a coat of heavy oil paint on one side, and a surface coat of varnish on said paint coat.

3. An oil cloth consisting of a sheet of plain untreated paper provided with a casein sizing, a linseed oil paint body and a surface coat of Chinese wood oil.

4. In a method of making an oil cloth comprising sizing a sheet of plain untreated paper, applying a coat of a heavy oil paint body thereon, polishing the same, applying successive coats of paint and applying a surface coat of varnish.

5. An oil cloth comprising a sheet of plain untreated paper, a coat of sizing and successive coats of an oil paint body on said sizing.

In testimony whereof I have signed my name to this specification.

THOMAS B. TALBERT.